(12) United States Patent
Roberts

(10) Patent No.: US 7,308,805 B2
(45) Date of Patent: *Dec. 18, 2007

(54) INTEGRATED MULTIPLE-LOOP REFRIGERATION PROCESS FOR GAS LIQUEFACTION

(75) Inventor: Mark Julian Roberts, Kempton, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/375,425

(22) Filed: Mar. 14, 2006

(65) Prior Publication Data

US 2006/0162378 A1     Jul. 27, 2006

Related U.S. Application Data

(63) Continuation of application No. 10/780,613, filed on Feb. 19, 2004, now Pat. No. 7,086,251, which is a continuation-in-part of application No. 10/391,390, filed on Mar. 18, 2003, now Pat. No. 6,742,357.

(51) Int. Cl.
*F25J 1/00*    (2006.01)

(52) U.S. Cl. ...................................... 62/612
(58) Field of Classification Search ............ 62/611, 62/612, 613, 614
See application file for complete search history.

(56) References Cited

U.S. PATENT DOCUMENTS

| | | | |
|---|---|---|---|
| 3,315,477 A | 4/1967 | Carr | |
| 3,413,816 A * | 12/1968 | De Marco | ............ 62/614 |
| 4,033,735 A | 7/1977 | Swenson | |
| 4,057,972 A | 11/1977 | Sarsten | |
| 4,094,655 A | 6/1978 | Krieger | |
| 4,112,700 A | 9/1978 | Forg | |
| 4,274,849 A | 6/1981 | Garier | |
| 4,334,902 A | 6/1982 | Paradowski | |
| 4,755,200 A | 7/1988 | Liu | |
| 5,791,160 A | 8/1998 | Mandler | |
| 6,119,479 A | 9/2000 | Roberts | |
| 6,250,105 B1 * | 6/2001 | Kimble | ............ 62/613 |
| 6,253,574 B1 | 7/2001 | Stockmann | |
| 6,308,531 B1 | 10/2001 | Roberts | |

(Continued)

FOREIGN PATENT DOCUMENTS

| | | |
|---|---|---|
| AU | A-43493/85 | 12/1985 |
| DE | 3521060 | 12/1985 |

(Continued)

*Primary Examiner*—William C Doerrler
(74) *Attorney, Agent, or Firm*—Willard Jones, II

(57) ABSTRACT

Method gas liquefaction which comprises cooling a feed gas stream successively through at least two heat exchange zones, wherein cooling is provided by respective vaporizing refrigerants, and wherein the refrigerant in the coldest temperature range is only partially vaporized in the coldest heat exchange zone and then is vaporized in a further heat exchange zone at temperatures above the highest temperature of the coldest heat exchange zone to form a totally vaporized refrigerant. The totally vaporized refrigerant is compressed to yield a compressed refrigerant stream, and the entire compressed refrigerant stream is either (i) cooled by indirect heat exchange in the further heat exchange zone, thereby providing self-refrigeration for the recirculating refrigeration process, or (ii) cooled in a heat exchange zone preceding the coldest heat exchange zone by indirect heat exchange with a respective vaporizing refrigerant and then further cooled the in the further heat exchange zone.

12 Claims, 7 Drawing Sheets

U.S. PATENT DOCUMENTS

| | | | |
|---|---|---|---|
| 6,742,357 B1 * | 6/2004 | Roberts | 62/612 |
| 2003/0089125 A1 | 5/2003 | Fredheim | |
| 2004/0065113 A1 | 4/2004 | Paradowski | |

FOREIGN PATENT DOCUMENTS

| | | |
|---|---|---|
| DE | 199 37 623 | 2/2001 |
| GB | 1572900 | 8/1980 |

* cited by examiner

US 7,308,805 B2

INTEGRATED MULTIPLE-LOOP REFRIGERATION PROCESS FOR GAS LIQUEFACTION

CROSS-REFERENCE TO RELATED APPLICATIONS

This application is a continuation of U.S. Ser. No. 10/780,613 filed on Feb. 19, 2004 now U.S. Pat. No. 7,086,251, which is a continuation-in-part of U.S. Ser. No. 10/391,390 filed on Mar. 18, 2003, now U.S. Pat. No. 6,742,357. Both of these applications are incorporated herein by reference.

BACKGROUND OF THE INVENTION

Multiple-loop refrigeration systems are widely used for the liquefaction of gases at low temperatures. In the liquefaction of natural gas, for example, two or three closed-loop refrigeration systems may be integrated to provide refrigeration in successively lower temperature ranges to cool and liquefy the feed gas. Typically, at least one of these closed-loop refrigeration systems uses a multi-component or mixed refrigerant which provides refrigeration in a selected temperature range as the liquid mixed refrigerant vaporizes and cools the feed gas by indirect heat transfer. Systems using two mixed refrigerant systems are well-known; in some applications, a third refrigerant system using a pure component refrigerant such as propane provides initial cooling of the feed gas. This third refrigerant system also may be used to provide a portion of the cooling to condense one or both of the mixed refrigerants after compression. Refrigeration in the lowest temperature range may be provided by a gas expander loop that is integrated with a mixed refrigerant loop operating in a higher temperature range.

In a typical multi-loop mixed refrigerant process for liquefying natural gas, the low level or coldest refrigeration loop provides refrigeration by vaporization in a temperature range of −30 to −165° C. to provide final liquefaction and optional subcooling of cooled feed gas. The refrigerant is completely vaporized in the coldest temperature range and may be returned directly to the refrigerant compressor, for example, as described in representative U.S. Pat. Nos. 6,119,479 and 6,253,574 B1. Alternatively, the completely vaporized refrigerant may warmed before compression to provide precooling of the feed gas as described in U.S. Pat. Nos. 4,274,849 and 4,755,200 or for cooling of refrigerant streams as described in Australian Patent AU-A-43943/85. A common characteristic feature of these typical liquefaction processes is that the refrigerant in the low level or coldest refrigeration loop is completely vaporized while providing refrigeration in the lowest temperature range. Any additional refrigeration provided by the refrigerant prior to compression thus is effected by the transfer of sensible heat from the vaporized refrigerant to other process streams.

In known liquefaction processes that use three integrated closed-loop refrigeration systems, the size of the process equipment in the third or lowest temperature refrigeration system may be smaller relative to the two warmer refrigeration systems. As the process liquefaction capacity is increased, the sizes of the compression and heat exchange equipment in the two warmer systems will reach the maximum sizes available from equipment vendors, while the sizes of the corresponding equipment in the lowest temperature refrigeration system will be smaller than the maximum sizes. In order to further increase the production capacity of this liquefaction process, parallel trains would be needed because of compression and/or heat exchanger size limitations in the two warmer refrigeration systems. It would be desirable to increase the maximum production capacity of this liquefaction process at the limits of available compressor and heat exchanger sizes, thereby allowing the use of larger single-train liquefaction processes.

BRIEF SUMMARY OF THE INVENTION

This need is addressed by embodiments of the present invention, which relate to integrated refrigeration systems having increased production capacity without requiring duplicate parallel equipment for the warmer refrigeration systems. One embodiment of the invention provides a method for liquefying a gas which comprises cooling a feed gas stream successively through at least two heat exchange zones (310, 311, 312; 353) at respective temperature ranges to provide a liquefied product (13), wherein refrigeration for cooling the feed gas stream in the temperature ranges is provided by respective vaporizing refrigerants (117, 213, 315), wherein the refrigerant (315) in the coldest temperature range is only partially vaporized in the coldest heat exchange zone (312) to form a partially vaporized refrigerant (316), and wherein the refrigerant is recirculated in a recirculating refrigeration process that comprises further vaporizing the partially vaporized refrigerant (316) in a further heat exchange zone (317, 355) at temperatures above the highest temperature of the coldest heat exchange zone (312) to form a totally vaporized refrigerant (318, 348), compressing (319, 324; 349) the totally vaporized refrigerant (318, 348) to yield a compressed refrigerant stream, and cooling the compressed refrigerant stream to provide a coldest refrigerant (315), characterized in that the entire compressed refrigerant stream is cooled by either (i) cooling the entire compressed refrigerant stream (328) in the further heat exchange zone (317) by indirect heat exchange with the further vaporizing partially vaporized refrigerant (316) to provide a cooled refrigerant stream (329), thereby providing self-refrigeration for the recirculating refrigeration process, and then by further cooling (312) the cooled refrigerant stream (329) to provide the coldest refrigerant (315), or (ii) cooling the entire compressed refrigerant stream (351) in a heat exchange zone (353) preceding the coldest heat exchange zone (312) by indirect heat exchange (352) with a respective vaporizing refrigerant (117), further cooling the refrigerant in the further heat exchange zone (355) by indirect heat exchange with the partially vaporized refrigerant (316) to provide a cooled refrigerant stream (329), and then further cooling (312) the cooled refrigerant stream (329) to provide the coldest refrigerant (315).

The feed gas stream (1) may be natural gas. The refrigerant (315, 316, 318, 328, 329) in the recirculating refrigeration process may be a multicomponent mixture comprising nitrogen, i-pentane, and n-pentane with the molar ratio of i-pentane to n-pentane in the refrigerant (315, 316, 318, 328, 329) being greater than one, and wherein the i-pentane and n-pentane are obtained from the feed gas stream (1) and the molar ratio of i-pentane to n-pentane in the refrigerant (315, 316, 318, 328, 329) is greater than the molar ratio of i-pentane to n-pentane in the feed gas stream (1). The refrigerant (315, 316, 318, 328, 329) in the recirculating refrigeration process may be a multicomponent mixture comprising nitrogen, i-pentane, and one or more hydrocarbons having four carbon atoms, the i-pentane and the one or more hydrocarbons having four carbon atoms being obtained from the feed gas stream (1), and the molar ratio of i-pentane to n-pentane in the refrigerant (315, 316, 318, 328, 329) being greater than one, wherein the i-pentane and n-pentane are obtained from the feed gas stream (1) and the molar ratio of i-pentane to the one or more hydrocarbons having four carbon atoms in the refrigerant (315, 316, 318, 328, 329) is greater than the molar ratio of i-pentane to the one or more hydrocarbons having four carbon atoms in the feed gas stream (1).

The refrigerant (315, 316, 318, 328, 329) in the recirculating refrigeration process may comprise (in mole %) 5-15% nitrogen, 30-60% methane, 10-30% ethane, 0-10% propane, and 5-15% i-pentane.

The further cooling of the cooled refrigerant stream (329) may be effected by indirect heat exchange with the coldest refrigerant (315) vaporizing in the coldest heat exchange zone (312). Prior to vaporization to cool the compressed refrigerant stream (328, 339), a cooled reduced-pressure liquid refrigerant (345) may be reduced in pressure and combined with the partially vaporized refrigerant (316) to provide a combined two-phase refrigerant (347) that is vaporized to cool the compressed refrigerant stream (328; 339), the compressed refrigerant vapor (330) may be cooled (332) to provide a partially-condensed refrigerant, the partially condensed refrigerant may be separated (333) into a refrigerant vapor stream (334) and a refrigerant liquid stream (335), the refrigerated vapor stream (334) may be compressed (336) and cooled (337) to form a partially condensed stream and the partially-condensed stream may be separated (338) into the compressed refrigerant vapor (328, 339) and a liquid stream (340), the pressure of the liquid refrigerant may be reduced (341) to provide a reduced-pressure liquid refrigerant (342), and the reduced-pressure liquid refrigerant (342) may be combined with the refrigerant liquid stream (343) and subcooled by indirect heat exchange (344) with the combined two-phase refrigerant (347) to provide the cooled reduced-pressure liquid refrigerant (345) for combining with the partially vaporized refrigerant (316).

Another embodiment of the invention includes a system for liquefying a gas stream (1) which comprises:

at least two heat exchange zones (310, 311 312; 353) adapted for cooling the gas stream (1) successively through respective temperature ranges to provide a liquefied product (13) and respective refrigeration systems for providing respective refrigerants in respective refrigerant lines (117, 213, 315) to the heat exchange zones (310, 311, 312; 353), wherein the coldest heat exchange zone (312) is adapted to only partially vaporize the respective (i.e., coldest) refrigerant (315), wherein the refrigeration system providing the coldest refrigerant is a recirculating refrigeration system comprising:

a further heat exchange zone (317, 355) adapted to further vaporize the resultant partially vaporized refrigerant at temperatures above the highest temperature of the coldest heat exchange zone (312), compression means (319, 324; 349) for compressing the vaporized refrigerant to provide the compressed refrigerant stream, piping means (318, 348) to provide vaporized refrigerant from the further heat exchange zone (317, 355) to the compression means (319, 324; 349), means to provide compressed refrigerant (328, 354) to the further heat exchange zone (317, 355), piping means to convey a cooled compressed refrigerant from the further heat exchange zone (317; 355) to the coldest heat exchange zone (312), and means to further cool (356) the cooled compressed refrigerant to provide a cooled compressed refrigerant (313), characterized in that the means to provide compressed refrigerant (328; 354) to the further heat exchange zone (317, 355) comprises either (i) piping means (329) to convey the entire compressed refrigerant stream (328) to the further heat exchange zone (317), wherein the further heat exchange zone (317) is adapted to provide self-refrigeration for the recirculating refrigeration system, or (ii) piping means to convey the entire compressed refrigerant stream (351) to a heat exchange zone (353) that precedes the coldest heat exchange zone (312), wherein the heat exchange zone (353) is adapted to cool the entire compressed refrigerant stream (351) by indirect heat exchange (352), and piping means to convey an intermediate cooled compressed refrigerant (354) to the further heat exchange zone (355).

In the system of this embodiment, the means to further cool (356) the cooled compressed refrigerant to provide a condensed refrigerant may comprise the coldest heat exchange zone (312) and the system may further comprise pressure reduction means (314) to reduce the pressure of the condensed refrigerant to provide the refrigerant to the refrigerant line (315) for the coldest heat exchange zone (312).

The further heat exchange zone (344) may include means for subcooling a refrigerant liquid to provide a subcooled refrigerant liquid and the coldest refrigeration system may comprise pressure reduction means (346) for reducing the pressure of the subcooled refrigerant liquid to provide a reduced-pressure refrigerant, piping means (347) for combining the reduced-pressure refrigerant with the partially vaporized refrigerant from the coldest heat exchange zone (312) to provide a combined vaporizing refrigerant stream to the further heat exchange zone (344), and piping means (330) to feed a combined vaporized refrigerant stream to the compression means.

The compression means for compressing the vaporized refrigerant (330) from the further heat exchange zone (344) may comprise:

a first stage compressor (331), an intercooler (332) adapted to cool and partially condense the resultant first compressed refrigerant stream from first stage compressor (331) to yield a partially-condensed first refrigerant stream, a first separator (333) to separate the partially condensed first compressed refrigerant stream into a first vapor refrigerant stream and a first liquid refrigerant stream, a second stage compressor (336) to compress the first vapor refrigerant stream to provide a compressed vapor refrigerant stream, an aftercooler (337) to cool the compressed vapor refrigerant stream to provide a cooled two-phase refrigerant stream, a second separator (338) to provide a second liquid refrigerant stream (340) and the and the compressed refrigerant to piping means (339) for feed to the further heat exchange zone (344), pressure reduction means (341) to reduce the pressure of the second liquid refrigerant stream to provide a reduced-pressure second refrigerant stream, and piping means (335, 342, 343) to combine the reduced-pressure second refrigerant stream and the first liquid refrigerant stream to provide the refrigerant liquid to the further heat exchange zone (344).

An alternative embodiment of the invention relates to a system for liquefying a gas stream through at least two heat exchange zones, each of which is cooled by a respective refrigeration system, wherein the coldest of the respective refrigeration systems comprises:

piping means (348) to provide the vaporized refrigerant from the further heat exchange zone (355) to the compression means (349) for compressing a vaporized third refrigerant (348) to provide a compressed refrigerant, cooling means (352) in a heat exchange zone preceding the coldest heat exchange zone (312) for cooling the compressed refrigerant (351) by indirect heat exchange with the respective refrigerant (117) vaporizing in the heat exchange zone (353) to provide a cooled compressed refrigerant, piping means (354) to provide the cooled compressed refrigerant to the further heat exchange zone (355) to further cool the cooled compressed refrigerant by indirect heat exchange with the vaporizing refrigerant from the coldest heat exchange zone (312) to provide a condensed refrigerant (329) and the vaporized third refrigerant (348), and pressure reduction means (314) to reduce the pressure of the condensed refrigerant to provide the refrigerant to the refrigerant line (315) to the coldest refrigerant zone (312).

DETAILED DESCRIPTION OF THE INVENTION

Embodiments of the invention described herein relate to improved refrigeration processes for gas liquefaction utilizing three closed-loop refrigeration systems that cool a feed stream through three temperature ranges at successively-decreasing temperatures. These embodiments are directed towards improvements to the refrigeration system that provides refrigeration in the lowest of these temperature ranges, wherein the sizes of the compressor and heat exchange equipment used in the refrigeration system in the lowest temperature range are increased relative to the sizes of the compressors and heat exchangers in the refrigeration systems used in the higher temperature ranges. The term refrigeration as used herein means the indirect transfer of heat at temperatures below ambient from a fluid stream to a refrigerant. A refrigerant is a pure or mixed fluid which absorbs heat from another stream by indirect heat exchange with that stream.

Figure 1:
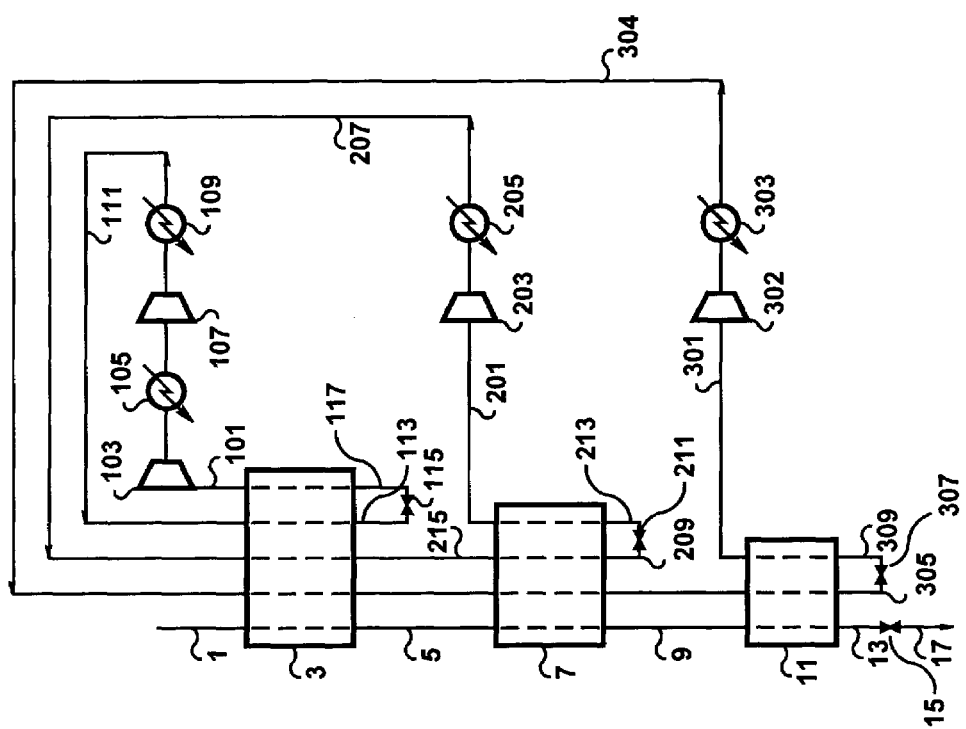
FIG. 1 is a schematic flow diagram of a gas liquefaction and refrigeration system according to the prior art.

A schematic flow diagram of a representative prior art liquefaction process is given in FIG. 1. Feed gas in line 1, for example, natural gas having been pretreated to remove water and other easily condensible impurities, is cooled through a first temperature range by indirect heat exchange with a first vaporizing refrigerant in first heat exchange zone or heat exchanger 3. The refrigerant may be a pure component refrigerant such as propane or alternatively may be a multi-component refrigerant comprising two or more light hydrocarbons selected from ethane, ethylene, propane, propylene, butane, and isobutane.

The cooled feed in line 5 is further cooled through a second temperature range by indirect heat exchange with a second vaporizing refrigerant in second heat exchange zone or heat exchanger 7. The further cooled feed in line 9 is still further cooled and liquefied through a third temperature range by indirect heat exchange with a third vaporizing refrigerant in third heat exchange zone or heat exchanger 11. The refrigerant typically is a multi-component refrigerant comprising two or more refrigerant components selected from methane, ethane, ethylene, propane, and propylene. Final liquefied product in line 13 may be reduced in pressure across expansion valve 15 to yield final liquid product in line 17.

Refrigeration for this process typically is provided by three nested or cascaded refrigeration systems. The first refrigeration system operates by supplying vapor refrigerant in line 101 to first compressor stage 103, wherein the gas is compressed to 2 to 4 bara (all pressures stated herein are absolute pressures), cooled in aftercooler 105, further compressed to 6 to 10 bara in second compressor 107, and cooled in aftercooler 109 to provide a compressed refrigerant at ambient temperature in line 111. The compressed refrigerant is further cooled and at least partially condensed in heat exchange passages in first heat exchange zone or heat exchanger 3. The partially or fully condensed refrigerant in line 113 is reduced in pressure across throttling valve 115 to provide reduced pressure refrigerant in line 117, and this refrigerant vaporizes in separate heat exchange passages to provide the refrigeration in first heat exchange zone or heat exchanger 3. Vaporized refrigerant in line 101 is compressed as described above.

The second refrigeration system operates by supplying vapor refrigerant in line 201 to compressor 203, wherein the gas is compressed to 10 to 20 bara and cooled in aftercooler 205 to approximately ambient temperature. The compressed refrigerant in line 207 is further cooled and at least partially condensed in heat exchange passages in first heat exchange zone or heat exchanger 3 and second heat exchange zone or heat exchanger 7. The partially or fully condensed refrigerant in line 209 is reduced in pressure across throttling valve 211 to provide reduced pressure refrigerant in line 213, and this refrigerant vaporizes in separate heat exchange passages to provide the refrigeration in second heat exchange zone or heat exchanger 7. Vaporized refrigerant in line 201 is compressed as described above.

The third refrigeration system operates by supplying vapor refrigerant in line 301 to compressor 302, wherein the gas is compressed to 35 to 60 bara and cooled in aftercooler 303 to approximately ambient temperature. The compressed refrigerant in line 304 is further cooled and at least partially condensed in heat exchange passages in first heat exchange zone or heat exchanger 3, second heat exchange zone or heat exchanger 7, and third heat exchange zone or heat exchanger 11. The partially or fully condensed refrigerant in line 305 is reduced in pressure across throttling valve 307 to provide reduced pressure refrigerant in line 309, and this refrigerant vaporizes in separate heat exchange passages to provide the refrigeration in third heat exchange zone or heat exchanger 11. Vaporized refrigerant in line 301 is compressed as described above. The use of the third refrigeration loop including heat exchanger 11 and compressor 302 provides a portion of the total refrigeration duty needed to liquefy the feed gas and reduces the refrigeration duties and sizes of the first and second refrigeration systems.

Known modifications or alternatives to the prior art process using three refrigeration loops of FIG. 1 are possible. For example, the first refrigeration loop may utilize cascade refrigeration in which the refrigerant is vaporized at three different pressures with the vaporized refrigerant returning to different stages in a multi-stage compressor. The second refrigeration loop may vaporize refrigerant at two different pressures through two separate sets of heat exchange passages in heat exchanger 7 and return each vaporized refrigerant stream to two separate compressor stages.

In another modification, the third refrigeration loop may vaporize refrigerant at two different pressures through two separate sets of heat exchange passages in heat exchanger 11 and return each vaporized refrigerant stream to two separate compressor stages. Vaporized refrigerant in line 301 prior to compressor 302 may be used in a separate heat exchanger to provide cooling for a portion of second refrigerant stream 215 and for a portion of compressed refrigerant in line 304.

In another known process with three refrigeration loops, vaporizing refrigerant in the first refrigeration loop is used to precool the feed gas; the first refrigeration loop compressor discharge is cooled and condensed by a portion of the vaporizing refrigerant from the second refrigeration loop. Vaporized refrigerant in the third refrigeration loop from the third heat exchanger prior to compression is used to further precool the feed gas. This further precooled feed gas then is cooled and condensed in the third heat exchanger. The second refrigeration loop cools and condenses the compressed third refrigerant.

A common characteristic feature of these known liquefaction processes is that the refrigerant in the third refrigeration loop, i.e., the low level or coldest refrigeration loop, is completely vaporized while providing refrigeration in the lowest temperature range. Any additional refrigeration provided by the refrigerant prior to compression is effected only by the transfer of sensible heat from the vaporized refrigerant to other process streams.

In the several embodiments of the present invention, the condensed refrigerant of the third or coldest refrigeration loop is only partially vaporized in the third heat exchange zone or heat exchanger in the third or lowest temperature range. The partially vaporized refrigerant from the third heat exchange zone or heat exchanger is further vaporized at temperatures above the lowest temperature in the second temperature range. This is illustrated by a first exemplary embodiment of the invention shown in FIG. 2. Feed gas in line 1, for example, natural gas having been pretreated to remove water and other condensible impurities, is cooled through a first temperature range by indirect heat exchange with a first vaporizing refrigerant in first heat exchange zone or heat exchanger 310. The refrigerant may be a multi-component refrigerant comprising, for example, two or more light hydrocarbons selected from ethane, ethylene, propane, butane, n-pentane, and i-pentane (i.e., 2-methyl butane). Alternatively, the refrigerant may be a single component such as propane. The upper temperature of the first temperature range may be ambient temperature and the lower temperature in the first temperature range may be between about $-35°$ C. and about $-55°$ C. The specific refrigerant composition may be selected to achieve a desired lower temperature in the first temperature range.

The cooled feed in line 5 is further cooled through a second temperature range by indirect heat exchange with a second vaporizing refrigerant in second heat exchange zone or heat exchanger 311 to a temperature between about $-40°$ C. and about $-100°$ C. The refrigerant typically is a multi-component refrigerant and may comprise, for example, two or more components selected from methane, ethane, ethylene, and propane. The specific refrigerant composition may be selected to achieve a desired lower temperature in the second temperature range.

The further cooled feed in line 9 is still further cooled and liquefied through a third temperature range, reaching a lower temperature between about $-85°$ C. and about $-160°$ C., by indirect heat exchange with a third vaporizing refrigerant in third heat exchange zone or heat exchanger 317. This refrigerant is a multi-component refrigerant and may comprise, for example, two or more components selected from methane, ethane, ethylene, propane, propylene, one or more hydrocarbons having four carbon atoms, n-pentane, i-pentane (i.e., 2-methyl butane), and nitrogen. In this refrigerant, i-pentane is a preferred (but not required) component. The specific refrigerant composition may be selected to achieve a desired lower temperature in the third temperature range. Final liquefied product in line 13 may be reduced in pressure across expansion valve 15 to yield final liquid product in line 17.

The first temperature range may be defined by a first temperature and a second temperature, and the first temperature may be ambient temperature. The second temperature range may be defined by the second temperature and a third temperature, and the third temperature range may be defined by the third temperature and a fourth temperature. The first temperature range is the highest or warmest temperature range and the third temperature range is the lowest or coldest temperature range. The first temperature is the highest temperature and the fourth temperature is the lowest temperature.

Refrigeration for this process may be provided by three nested or cascaded refrigeration systems. The first refrigeration system may be similar to the first refrigeration system as described above with reference to FIG. 1, and may operate by supplying vapor refrigerant in line 101 to first compressor stage 103, wherein the gas is compressed to 2 to 4 bara, cooled in aftercooler 105, further compressed to 6 to 10 bara in second compressor 107, and cooled in aftercooler 109 to provide a compressed refrigerant at ambient temperature in line 111. The compressed refrigerant is further cooled and at least partially condensed in heat exchange passages in first heat exchange zone or heat exchanger 310. The partially or fully condensed refrigerant in line 113 is reduced in pressure across throttling valve 115 to provide reduced pressure refrigerant in line 117, and this refrigerant vaporizes in separate heat exchange passages to provide the refrigeration in first heat exchange zone or heat exchanger 3. Vaporized refrigerant in line 101 is compressed as described above.

The second refrigeration system may be similar to the first refrigeration system as described above with reference to FIG. 1, and may operate by supplying vapor refrigerant in line 201 to compressor 203, wherein the gas is compressed to 10 to 20 bara and cooled in aftercooler 205 to approximately ambient temperature. The compressed refrigerant in line 207 is further cooled and at least partially condensed in heat exchange passages in first heat exchange zone or heat exchanger 310 and second heat exchange zone or heat exchanger 311. The partially or fully condensed refrigerant in line 209 is reduced in pressure across throttling valve 211 to provide reduced pressure refrigerant in line 213, and this refrigerant vaporizes in separate heat exchange passages to provide the refrigeration in second heat exchange zone or heat exchanger 311. Vaporized refrigerant in line 201 is compressed as described above.

The third refrigeration system of this embodiment departs from the prior art third refrigeration system described earlier and operates independently of the first and second refrigeration systems. In this third refrigeration system, condensed refrigerant in line 313 is reduced in pressure across throttling valve 314 and reduced-pressure condensed refrigerant from line 315 is partially vaporized in third heat exchange zone or heat exchanger 312 to provide refrigeration therein. Partially-vaporized refrigerant flows through line 316 and vaporizes completely in fourth heat exchange zone or heat exchanger 317 to provide refrigeration therein. Vaporized refrigerant in line 318, typically at near ambient temperature and a pressure of 2 to 10 bara is compressed in first compressor 319, cooled and partially condensed in intercooler 320, and separated in separator 321 to provide a vapor stream in line 322 and a liquid stream in line 323.

The vapor stream in line 322 is further compressed to a pressure of 30 to 70 bara in compressor 324, the liquid stream in line 323 is pressurized by pump 325 to the same pressure, the two pressurized streams are combined to provide two-phase refrigerant stream 326, which is further cooled in aftercooler 327. Partially or fully condensed refrigerant in line 328 is further cooled in fourth heat exchange zone or heat exchanger 317 to provide cooled refrigerant in line 329. The cooled refrigerant in line 329 is further cooled in flow passages 356 of third heat exchange zone or heat exchanger 312 to yield refrigerant 313 described above.

The mixed refrigerant used in the third refrigerant system contains selected components and compositions that allow the refrigerant to vaporize over a broad temperature range. The criteria for selecting these components and the temperature range over which the refrigerant vaporizes are different than the criteria for selecting the mixed refrigerants typically used in the third or low level refrigeration loop of three-loop liquefaction systems known in the art. The mixed refrigerant in the third loop of the present invention should be capable of vaporizing in the third temperature range (i.e., in third heat exchange zone or heat exchanger 312) as well as at temperatures above the lowest temperature in the second temperature range (i.e., above the lowest temperature in second heat exchange zone or heat exchanger 311). Depending on the refrigerant composition and pressure, vaporization may be possible and desirable at temperatures above the highest temperature in the second temperature range.

Typical compositions (in mole %) of the refrigerant used in the third loop may include 5-15% nitrogen, 30-60% methane, 10-30% ethane, 0-10% propane, and 5-15% i-pentane. One or more hydrocarbons having four carbon atoms may be present in the refrigerant, but preferably the total concentration of the one or more hydrocarbons having four carbon atoms is lower than the concentration of i-pentane. The molar ratio of i-pentane to the one or more hydrocarbons having four carbon atoms in the refrigerant typically is greater than one and may be greater than 1.5. Normal pentane (n-pentane) also may be present in the refrigerant, preferably at lower concentrations than i-pentane.

The refrigeration components for use in the third refrigeration loop may be provided from hydrocarbon liquids heavier than methane that are condensed by initial cooling of a natural gas feed. These condensed natural gas liquids (NGLs) may be recovered and fractionated by known methods to obtain the individual components for use in the preferred mixed refrigerant. When the natural gas feed contains both n-pentane and i-pentane, for example, and when these components are recovered from NGLs by distillation for use in the refrigerant in the third refrigerant loop, the molar ratio of i-pentane to n-pentane in the refrigerant may be greater than the molar ratio of i-pentane to n-pentane in the feed gas. Preferably, the molar ratio of i-pentane to n-pentane in the refrigerant is greater than twice the molar ratio of i-pentane to n-pentane in the feed gas. i-pentane is preferred over n-pentane for use in this refrigerant because i-pentane has a lower freezing point than n-pentane, which allows the refrigerant to be used at lower temperatures.

When the natural gas feed contains both i-pentane and one or more hydrocarbons having four carbon atoms, and when these components are recovered from NGLs by distillation for use in the refrigerant in the third refrigerant loop, the molar ratio of i-pentane to the one or more hydrocarbons having four carbon atoms in the refrigerant may be greater than the molar ratio of i-pentane to the one hydrocarbons having four carbon atoms in the feed gas.

Figure 2:
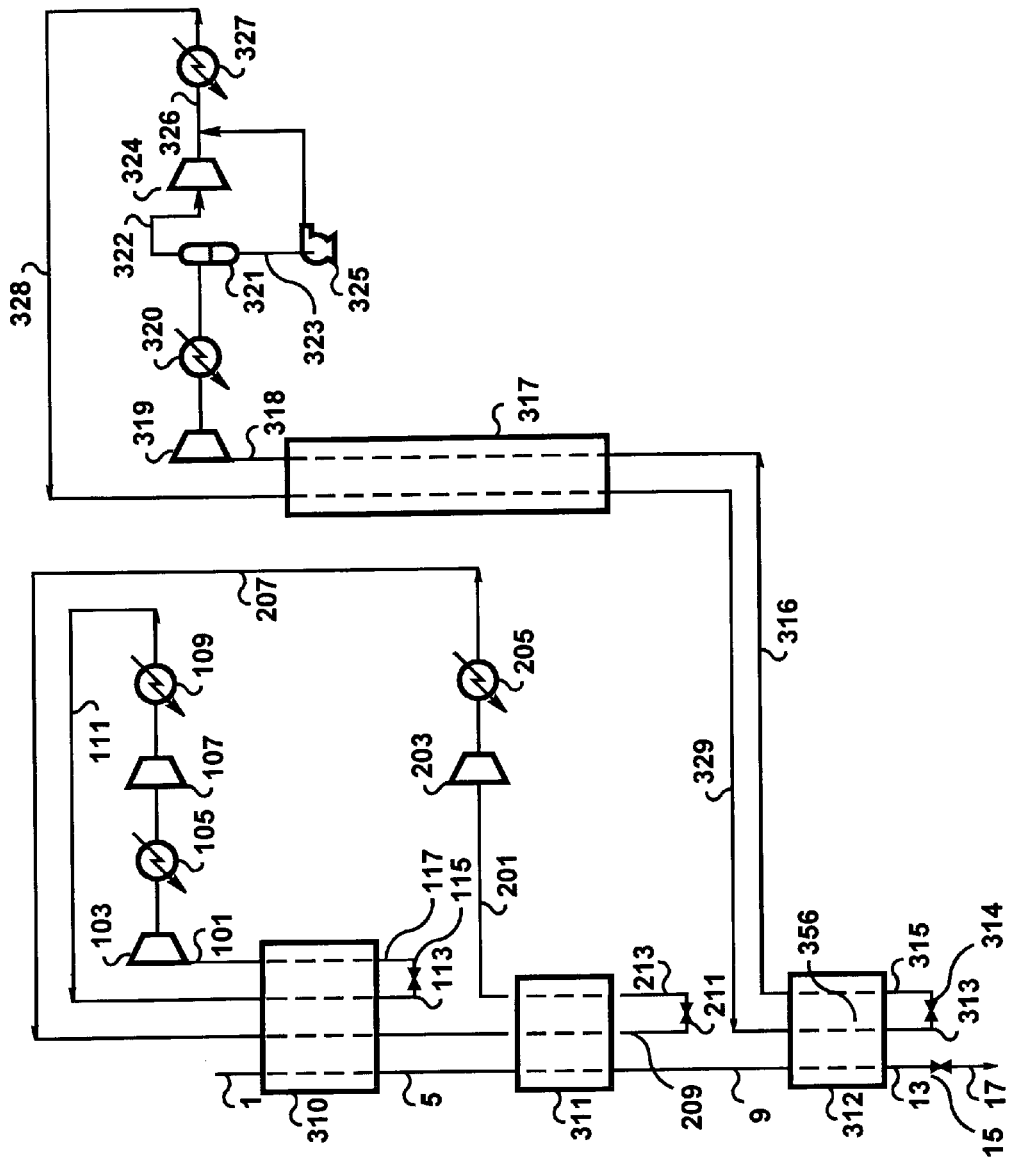
FIG. 2 is a schematic flow diagram of a gas liquefaction and refrigeration system according to an exemplary embodiment of the present invention.

The third refrigeration loop in this embodiment is self-refrigerated and is independent of the first and second refrigeration loops. In contrast with the process of FIG. 1, compressed refrigerant in the third refrigeration loop of FIG. 2 is not cooled in the first and second heat exchange zones by the first and second refrigeration loops. This unloads the first and second refrigeration loops, and thus reduces the sizes of the first and second heat exchange zones and the compression equipment in the first and second refrigeration loops compared to the process of FIG. 1. This is particularly beneficial when the process of FIG. 2 is used in a liquefaction system designed for a very large product throughput. When the sizes of the compression and heat exchange equipment in the first and second refrigeration loops reach the maximum sizes available from equipment vendors, a higher production rate can be achieved with the process of FIG. 2 than with the process of FIG. 1.

Variations to the process embodiment of FIG. 2 are possible. For example, one stage or more than two stages of compression may be used as required, which would form multiple liquid streams for pumping in conjunction with the vapor compression stages. In another variation, the refrigerant composition and pressures in the compression system may be such that interstage condensation does not occur and vapor/liquid separation is not required.

In an alternative embodiment of the process of FIG. 2, the second refrigeration system is not required, and heat exchanger 311, valve 211, compressor 203, cooler 205, and the associated piping are not used. In this alternative, heat exchange zone or heat exchanger 310 would not include passages for cooling refrigerant supplied via line 207. The process in this embodiment therefore comprises cooling the feed gas in line 1 successively through first and second temperature ranges to provide a liquefied product in line 13, wherein refrigeration for cooling the gas stream is provided by a first refrigerant in line 117 vaporizing in the first temperature range and a second refrigerant in line 315 vaporizing in the second temperature range and further vaporizing at temperatures above a lowest temperature in the first temperature range. Thus the temperature ranges in which the first and second refrigerants vaporize overlap. In this alternative embodiment, the first refrigerant may be propane and the second refrigerant may be a multi-component refrigerant. In another version of this embodiment, both refrigerants may be selected multi-component refrigerants.

Figure 3:
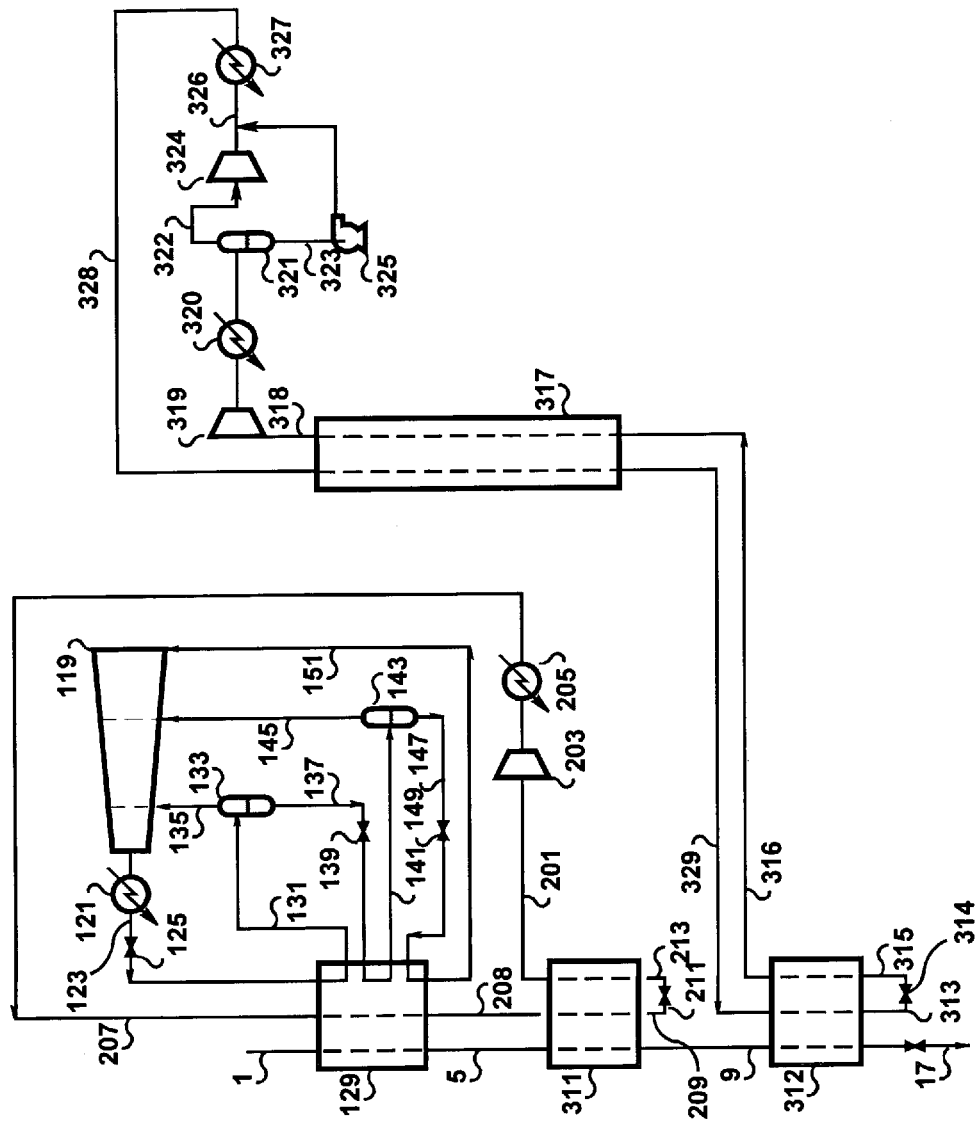
FIG. 3 is a schematic flow diagram of a gas liquefaction and refrigeration system according to an alternative exemplary embodiment of the present invention.

An alternative embodiment of the exemplary process of FIG. 2 is illustrated in FIG. 3. In this alternative, the first refrigeration loop of FIG. 2 (compressors 103 and 107, coolers 105 and 109, and throttling valve 115) is replaced by a single-component cascade refrigeration system. Propane may be used as the single refrigerant in the first refrigeration loop. In this embodiment, the second and third refrigeration loops remain unchanged from the embodiment of FIG. 2.

Multi-stage compressor 119 and aftercooler 121 are operated to provide compressed refrigerant in line 123 at near ambient temperature and a pressure in the range of 10 to 15 bara. The compressed refrigerant inline 123 is reduced in pressure across throttling valve 125 and the reduced-pressure refrigerant in line 127 is partially vaporized in heat exchange zone or heat exchanger 129 to provide refrigeration therein and yield a two-phase refrigerant in line 131. This two-phase refrigerant is separated in separator 133 to provide vapor in line 135, which vapor is returned to a lower pressure stage suction of compressor 119, and liquid in line 137. This liquid is reduced in pressure across throttling valve 139 and is partially vaporized in heat exchanger 129 to provide refrigeration therein. Two-phase refrigerant in line 141 is separated in separator 143 to yield vapor in line 145, which vapor is returned to an intermediate stage suction of compressor 119, and liquid in line 147. This liquid is reduced in pressure across throttling valve 149 and the reduced-pressure refrigerant is vaporized in heat exchanger 129 to provide additional refrigeration therein. Vapor in line 151 is returned to the inlet of compressor 119.

Figure 4:
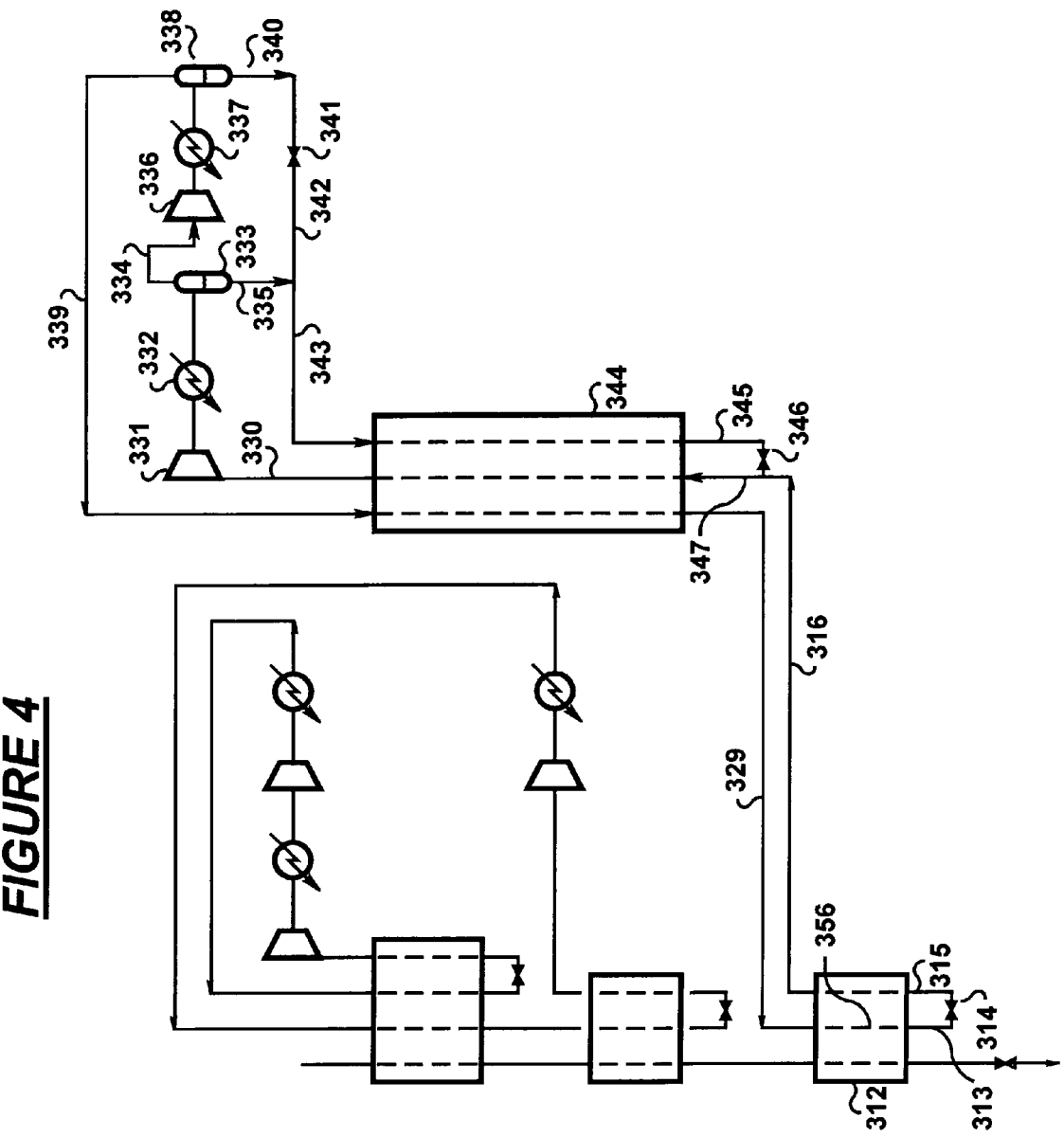
FIG. 4 is a schematic flow diagram of a gas liquefaction and refrigeration system according to another exemplary embodiment of the present invention.

Another alternative to the exemplary embodiment of FIG. 2 is illustrated in FIG. 4. In this embodiment, a modified third refrigeration loop is used wherein liquid formed in the compression step is combined with partially vaporized liquid from the third heat exchanger and the combined stream provides the refrigeration to cool the compressed refrigerant vapor. Vaporized refrigerant in line 330 is compressed in compressor 331 to 2 to 10 bara, cooled and partially condensed in aftercooler 332, and separated in separator 333 to provide vapor in line 334 and liquid in line 335. The vapor in line 334 is further compressed in compressor 336 to 6 to 20 bara, cooled and partially condensed in aftercooler 337, and separated in separator 338 to provide vapor in line 339 and liquid in line 340.

The liquid in line 340 is reduced in pressure across throttling valve 341, the reduced-pressure liquid in line 342 is combined with the liquid from line 335, and the combined liquid in line 343 is subcooled in fourth heat exchange zone or heat exchanger 344 to yield a subcooled liquid refrigerant in line 345. This subcooled refrigerant is reduced in pressure across throttling valve 346 and combined with partially-vaporized refrigerant in line 316 from third heat exchange zone or heat exchanger 312. The combined refrigerant in line 347 is vaporized in heat exchanger 344 to provide refrigeration therein and yield refrigerant vapor in line 330. Cooled refrigerant in line 329 is further cooled and at least partially liquefied in third heat exchange zone or heat exchanger 312, reduced in pressure across throttling valve 314 to provide reduced-pressure refrigerant in line 315, wherein the reduced-pressure refrigerant is partially vaporized in heat exchanger 312 to provide refrigeration therein as described above. Partially-vaporized refrigerant in line 316 returns to heat exchanger 344 as described above.

Figure 5:
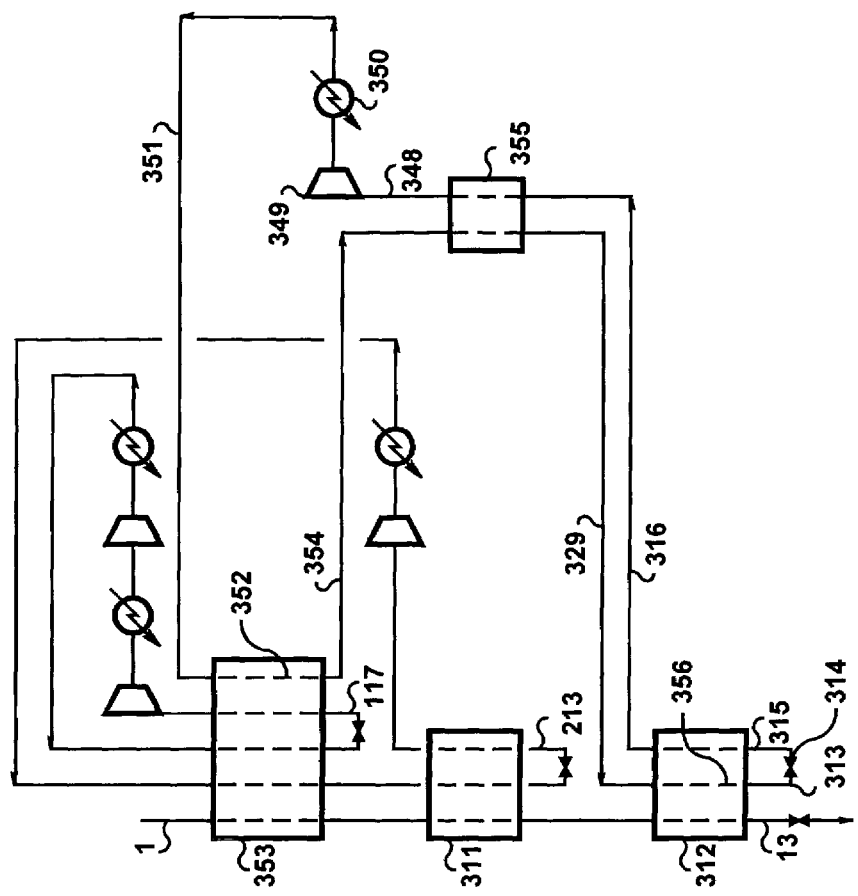
FIG. 5 is a schematic flow diagram of a gas liquefaction and refrigeration system according to another alternative exemplary embodiment of the present invention.

Another alternative to the exemplary embodiment of FIG. 2 is illustrated in FIG. 5. In this exemplary embodiment, a modified third refrigeration loop is used wherein the refrigerant is compressed at sub-ambient temperatures and a portion of the cooling of the compressed refrigerant is provided by the first refrigeration loop. Referring to FIG. 5, refrigerant vapor in line 348 at a temperature in the range of 0 to −90° C. is compressed in compressor 349 to 10 to 20 bara and cooled in aftercooler 350 to ambient temperature. Cooled compressed refrigerant in line 351 is further cooled in flow passages 352 of first heat exchange zone or heat exchanger 352, wherein refrigeration is provided by the first refrigeration loop as earlier described.

Cooled refrigerant in line 354 is further cooled in fourth heat exchange zone or heat exchanger 355 to provide a further cooled refrigerant in line 329. Cooled refrigerant in line 329 is further cooled and at least partially liquefied in third heat exchange zone or heat exchanger 312, reduced in pressure across throttling valve 314 to provide reduced-pressure refrigerant in line 315, wherein the reduced-pressure refrigerant is partially vaporized in heat exchanger 312 to provide refrigeration therein as described above. Partially-vaporized refrigerant in line 316 returns to heat exchanger 354 as described above.

In this alternative embodiment, mixed refrigerant in line 348 is at a temperature in the range of 0 to −90° C. at the inlet to compressor 349. The use of cold compression in compressor 349 contrasts with the embodiments of FIGS. 2, 3, and 4, wherein the refrigerant vapor enters the compressor inlet at approximately ambient temperature. The mixed refrigerant in the embodiment of FIG. 5 is lighter than the refrigerant in the embodiment of FIG. 2; preferably, the mixed refrigerant of FIG. 5 contains no components heavier than propane.

Any of the embodiments of FIGS. 1 to 5 may be installed as a retrofit to an existing two-loop dual mixed refrigerant liquefaction plant or two-loop propane-mixed refrigerant natural gas liquefaction plant.

Figure 6:
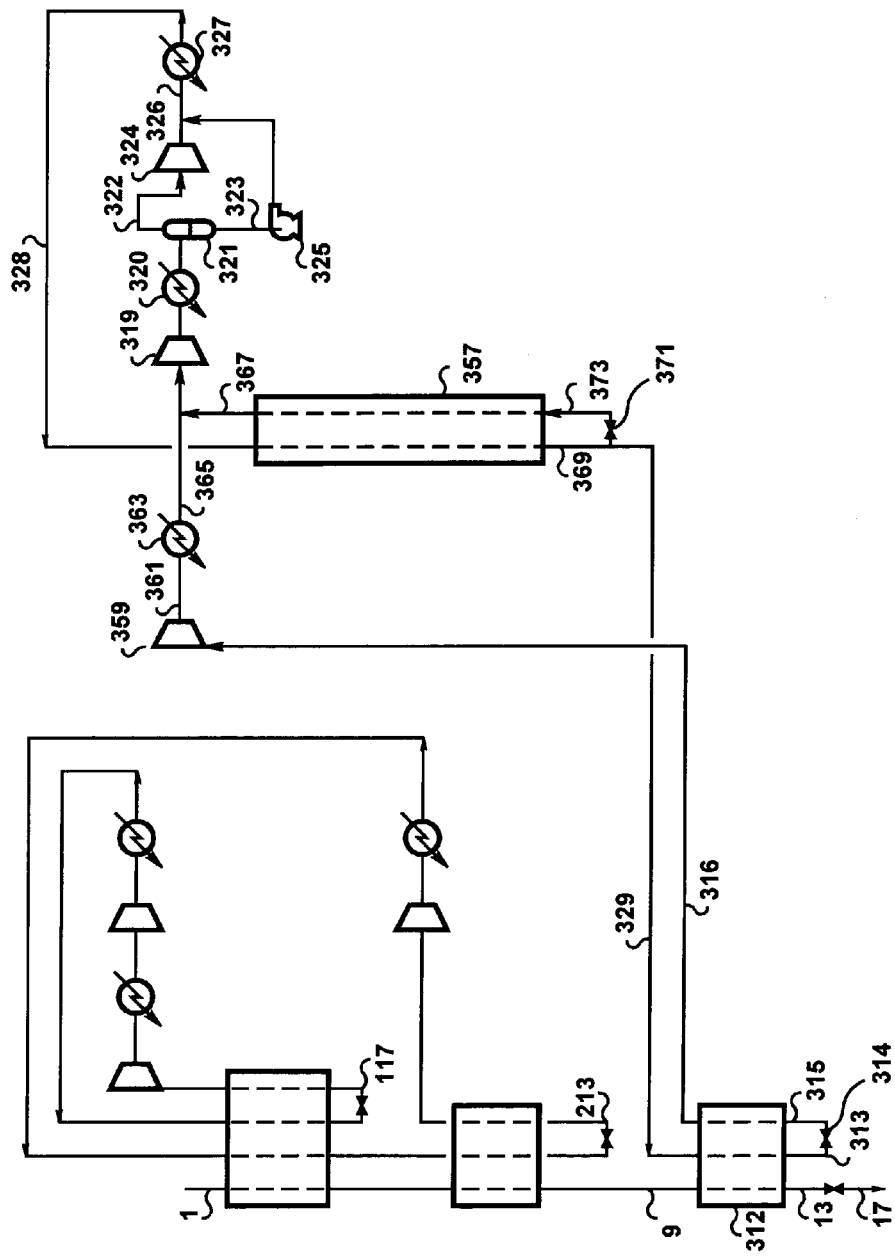
FIG. 6 is a schematic flow diagram of a gas liquefaction and refrigeration system according to another alternative exemplary embodiment of the present invention utilizing two pressure levels for the vaporization of the coldest refrigerant.

Another alternative to the exemplary embodiment of FIG. 2 is illustrated in FIG. 6. In this exemplary embodiment, the third refrigeration loop that provides refrigeration to cold heat exchanger 312 is modified so that the refrigerant is totally vaporized and compressed at sub-ambient temperatures. A portion of the cooling of the compressed refrigerant is provided by autorefrigeration in heat exchanger 357 at temperatures above the highest temperature of third heat exchange zone or heat exchanger 312 and above the lowest temperature of the feed stream in heat exchanger 311. The pressure of the vaporizing refrigerant in heat exchanger 357 is higher than the pressure of the vaporizing refrigerant in cold heat exchanger 312. In the embodiment of FIG. 6, the feed stream in line 9 being liquefied is cooled to its final lowest temperature in this cold heat exchanger to provide liquid product in line 13, which may be reduced in pressure to provide a reduced-pressure product in line 17. The refrigeration for this final cooling is provided by cooling the refrigerant in line 329 to provide cooled liquid refrigerant in line 313, reducing the pressure across throttling valve 314 to yield reduced-pressure refrigerant in line 315, and totally vaporizing this refrigerant to provide the refrigeration in heat exchanger 312.

The vaporized refrigerant in line 316 is compressed to a pressure in the range of 3 to 25 bara in first compressor 359 and the compressed stream in line 361 is cooled to near ambient temperature in cooler 363 to provide intermediate compressed gas in line 365. The intermediate compressed gas is combined with a vaporized auxiliary refrigerant stream in line 367 (described below) and the combined refrigerant stream is further compressed as described in the embodiments of FIGS. 2 and 3. The combined refrigerant stream, typically at near ambient temperature and a pressure of 20 to 50 bara, is compressed in second compressor 319, cooled and partially condensed in intercooler 320, and separated in separator 321 to provide a vapor stream in line 322 and a liquid stream in line 323.

The vapor stream in line 322 is further compressed to a pressure of 30 to 70 bara in compressor 327, the liquid stream from separator 321 is pressurized by pump 325 to the same pressure, the two pressurized streams are combined to provide two-phase refrigerant stream 326, which is further cooled in aftercooler 327 by air or cooling water.

Partially or fully condensed refrigerant in line 328 is further cooled in heat exchanger 357 to provide cooled refrigerant in line 369 and this refrigerant stream is divided into first and second portions. The first portion is reduced in pressure across throttling valve 371 and the reduced-pressure refrigerant, which may be defined as an auxiliary refrigerant, flows via line 373 to heat exchanger 357, where it is warmed and vaporized to provide refrigeration therein and to yield the vaporized auxiliary refrigerant stream in line 367. The second portion of the cooled refrigerant flows via line 329 and is further cooled in heat exchanger 312 to yield refrigerant 313 described above. Thus the auxiliary refrigerant in lines 367 and 373 is derived from the refrigerant in line 315 and in this embodiment has the same composition as the refrigerant in line 315.

Optionally, separator 321, pump 325, compressor 324, and cooler 327 are not used and the partially or fully condensed refrigerant in line 328 is provided directly from cooler 320.

Typically, the low pressure refrigerant stream in line 315 will be vaporized in a pressure range of about 2 to 10 bara in heat exchanger 312, while intermediate pressure refrigerant stream in line 373 will be vaporized at a higher pressure in a range of about 5 to 20 bara in heat exchanger 357. When the above embodiments are used for the liquefaction of natural gas, hydrocarbons heavier than methane may be condensed and removed before final methane liquefaction by known methods including scrub columns or other partial condensation and/or distillation processes. As described above, these condensed natural gas liquids (NGLs) may be fractionated to provide selected components for the refrigerants in the refrigeration systems. Modifications to this embodiment may include provision for vaporizing a portion of the refrigerant in line 369 at a third higher pressure to provide warmer refrigeration than that provided by the lower pressure vaporizing refrigerant streams in lines 315 and 373.

Figure 7:
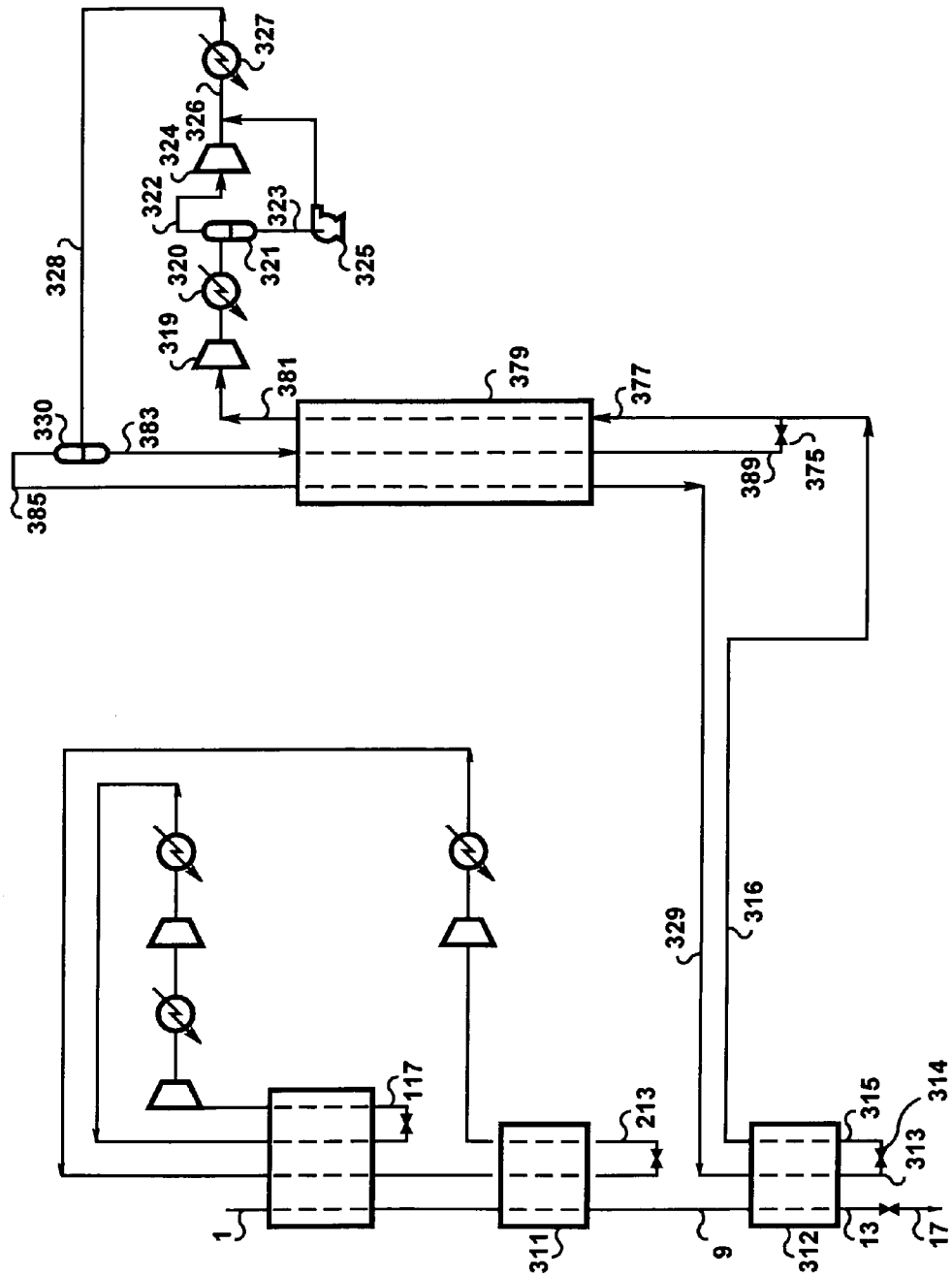
FIG. 7 is a schematic flow diagram of a gas liquefaction and refrigeration system according to another alternative exemplary embodiment of the present invention utilizing phase separation of the refrigerant used in the coldest temperature range.

Another alternative to the exemplary embodiment of FIG. 2 is illustrated in FIG. 7. In this exemplary embodiment, the third refrigeration loop that provides refrigeration to cold heat exchanger 312 is modified to provide autorefrigeration by an internal auxiliary liquid refrigerant derived from the third refrigerant by phase separation. In the embodiment of FIG. 7, the feed stream in line 9 being liquefied is cooled to its final lowest temperature in this cold heat exchanger and reduced in pressure to provide liquid product in line 13, which may be reduced in pressure to provide a reduced-pressure product in line 17. The refrigeration for this final cooling is provided by cooling the refrigerant in line 329 to provide cooled liquid refrigerant in line 313, reducing the pressure across throttling valve 314 to yield reduced-pressure refrigerant in line 315, and partially or fully vaporizing this refrigerant to provide the refrigeration in heat exchanger 312.

The partially or fully vaporized refrigerant in line 316 is combined with a reduced-pressure refrigerant provided by pressure reduction across throttling valve 375 (described below) to yield a combined refrigerant stream in line 377. This combined refrigerant stream, which may be described as an auxiliary refrigerant stream, is warmed and vaporized in heat exchanger 379 to provide refrigeration therein and to generate vaporized auxiliary refrigerant in line 381. This vaporized auxiliary refrigerant is compressed in compressor 319, cooled and partially condensed in intercooler 320, and separated in separator 321 to provide a vapor stream in line 322 and a liquid stream in line 323.

The vapor stream in line 322 is further compressed to a pressure of 30 to 70 bara in compressor 324, the liquid stream from separator 321 is pressurized by pump 325 to the same pressure, the two pressurized streams are combined to provide two-phase refrigerant stream 326, which is further cooled in aftercooler 327 by air or cooling water to provide a partially condensed auxiliary refrigerant in line 328.

Optionally, separator 321, pump 325, compressor 324, and cooler 327 are not used and the partially condensed auxiliary refrigerant in line 328 is provided directly from cooler 320.

This partially condensed auxiliary refrigerant flows via line 328 to separator 330, where it is separated to yield a vapor refrigerant fraction in line 385 and a liquid refrigerant fraction in line 383. The liquid refrigerant fraction in line 383 is cooled in heat exchanger 379 to yield cooled refrigerant in line 389, which is reduced in pressure across throttling valve 375 and combined with partially or fully vaporized refrigerant in line 316 to yield the auxiliary refrigerant stream in line 377.

Thus the refrigerant in lines 328, 377, and 381 is an auxiliary refrigerant derived from the refrigerant in line 315. In this embodiment, this auxiliary refrigerant contains the same components but has a different composition than the refrigerant in line 315. The different composition is a result of the phase separation of the partially condensed refrigerant in line 328 to yield the liquid refrigerant in line 387 and the vapor refrigerant in line 385.

Both embodiments illustrated in FIGS. 6 and 7 differ from the prior art in that refrigerant from the third cooling loop that provides the lowest temperature of refrigeration is vaporized to provide refrigeration in temperature ranges both above and below the lowest temperature of the feed being cooled by the second cooling loop in heat exchanger 311. Thus refrigeration above the lowest temperature of the feed in heat exchanger 311 is provided in heat exchanger 357 (FIG. 6) or 379 (FIG. 7) by vaporizing an auxiliary refrigerant derived from the refrigerant in line 315 that provides the refrigeration in coldest heat exchanger 312. Refrigeration below the lowest temperature of the feed being cooled in heat exchanger 311 is provided in heat exchanger 312. Thus the refrigeration in these two temperature ranges, i.e., both above and below the lowest temperature of the feed in heat exchanger 311, is provided by the third cooling loop.

Additionally, all or most of the refrigeration to cool the high pressure refrigerants in lines 383 and 385 after phase separation is provided by autorefrigeration in the third cooling loop, and this cooling of the compressed refrigerant in the third cooling loop is performed independently of the two warmer cooling loops. This feature is beneficial in that it greatly unloads the refrigeration requirements of the two warmer cooling loops, thereby allowing larger product capacities in natural gas liquefaction plants when the compressors in the two warmer cooling loops reach the maximum commercially available size. Either of the embodiments of FIGS. 6 and 7 may be installed as a retrofit to an existing two-loop dual mixed refrigerant liquefaction plant or two-loop propane-mixed refrigerant natural gas liquefaction plant.

EXAMPLE

The process of FIG. 3 is illustrated by the following non-limiting example in which a feed gas stream of 100 kg-moles/hr of natural gas in line 1 is liquefied to provide a liquefied natural gas (LNG) product in line 17. The feed gas in line 1, having been purified previously (not shown) to remove water and acid gas impurities, is provided at a temperature of 27° C. and a pressure of 60 bara. The feed gas in line 1 and mixed refrigerant vapor in line 207 are cooled to a temperature of −33° C. in first heat exchanger 129 by three stages of propane cooling. To effect this cooling, propane is evaporated at three pressure levels forming three suction streams (135,145, and 151) to propane compressor 119. The pressures of the three suction streams are 1.3 bara, 2.8 bara, and 4.8 bara respectively. Compressor 119 has a discharge pressure of 16.3 bara. The propane is cooled to a temperature of 43° C. and condensed in aftercooler 121 using an ambient temperature cooling medium such as cooling water or air. Total propane flow in line 123 is 114 kg-mole/hr.

The cooled feed in line 5 and second mixed refrigerant in line 208 are cooled to a temperature of −119° C. in second heat exchanger 311 to yield further cooled feed in line 9 and further cooled second mixed refrigerant in line 209. The mixed refrigerant in line 209 is throttled across valve 211 to a pressure of 4.2 bara to yield a reduced-pressure mixed refrigerant in line 213. The mixed refrigerant in line 213 is vaporized in heat exchanger 311 to provide refrigeration therein. The mixed refrigerant for this second cooling loop has a flow rate of 87 kg moles/hr and a composition of 27 mole % methane, 63 mole % ethane and 10 mole % propane. The vaporized second mixed refrigerant stream in line 201 is compressed in three-stage intercooled compressor 203 to a pressure of 57 bara. The compressed mixed refrigerant is cooled in aftercooler 205 to 36.5° C. using cooling water to provide cooled compressed mixed refrigerant in line 207.

Feed in line 9 and third mixed refrigerant in line 329 are cooled to a final temperature of −156° C. in third heat exchanger 312 to yield, respectively, liquefied LNG product in line 17 and condensed third mixed refrigerant in line 313. The mixed refrigerant in line 313 is throttled across valve 314 to a pressure of 3.7 bara to provide reduced-pressure third mixed refrigerant in line 315. This reduced-pressure third mixed refrigerant partially vaporizes in third heat exchanger 312 to provide refrigeration therein, and the partially-vaporized refrigerant in line 316 has a vapor fraction of 55% and a temperature of −123° C. The mixed refrigerant for this third cooling loop has a flow rate of 59 kg-moles/hr and a composition (in mole %) of 12% nitrogen, 52% methane, 18% ethane, 6% propane, and 12% i-pentane.

Mixed refrigerant in line 316 is fully vaporized and warmed to 26° C. in fourth heat exchanger 317 to provide refrigeration therein. Vaporized refrigerant in line 318 is compressed to 17.7 bara in first stage compressor 319, cooled to 36.5° C. and partially liquefied in water-cooled intercooler 320. The two-phase refrigerant is separated in separator 321 to yield refrigerant vapor in line 322 and refrigerant liquid in line 323. The refrigerant liquid is pressurized in pump 325 to 47 bara. Refrigerant vapor in line 322 is compressed to a pressure of 47 bara in compressor 324, combined with the pressurized refrigerant from pump 325, and the combined stream in line 326 is cooled in water-cooled aftercooler 327 to 36.5° C. to yield cooled mixed refrigerant in line 328. This mixed refrigerant is cooled in fourth heat exchanger 317 to provide cooled mixed refrigerant in line 329, which is further cooled in third heat exchanger 312 as earlier described.

In the above description of FIGS. 1-7, reference numbers for lines (i.e., pipes through which process streams flow) also may refer to the process streams flowing in those lines. In the following method claims, reference numbers denote process streams flowing in those lines. In the following system claims, the reference numbers denote the lines rather than the process streams flowing in these lines. Reference numbers from FIGS. 2-7 are included in the following claims for clarity and are not meant to limit the scope of the claims in any way.

The invention claimed is:

1. A method for liquefying a gas (1) which comprises cooling a feed gas stream successively through at least two heat exchange zones (310, 311, 312; 353) at respective temperature ranges to provide a liquefied product (13), wherein refrigeration for cooling the feed gas stream in the temperature ranges is provided by respective vaporizing refrigerants (117, 213, 315), wherein the refrigerant (315) in the coldest temperature range is only partially vaporized in the coldest heat exchange zone (312) to form a partially vaporized refrigerant (316), and wherein the refrigerant is recirculated in a recirculating refrigeration process that comprises further vaporizing the partially vaporized refrigerant (316) in a further heat exchange zone (317, 355) at temperatures above the highest temperature of the coldest heat exchange zone (312) to form a totally vaporized refrigerant (318, 348), compressing (319, 324; 349) the totally vaporized refrigerant (318, 348) to yield a compressed refrigerant stream, and cooling the compressed refrigerant stream to provide a coldest refrigerant (315), characterized in that the entire compressed refrigerant stream is cooled by either (i) cooling the entire compressed refrigerant stream (328) in the further heat exchange zone (317) by indirect heat exchange with the further vaporizing partially vaporized refrigerant (316) to provide a cooled refrigerant stream (329), thereby providing self-refrigeration for the recirculating refrigeration process, and then by further cooling (312) the cooled refrigerant stream (329) to provide the coldest refrigerant (315), or (ii) cooling the entire compressed refrigerant stream (351) in a heat exchange zone (353) preceding the coldest heat exchange zone (312) by indirect heat exchange (352) with a respective vaporizing refrigerant (117), further cooling the refrigerant in the further heat exchange zone (355) by indirect heat exchange with the partially vaporized refrigerant (316) to provide a cooled refrigerant stream (329), and then further cooling (312) the cooled refrigerant stream (329) to provide the coldest refrigerant (315).

2. A method of claim 1 wherein the feed gas stream (1) is natural gas.

3. A method of claim 1 or claim 2 wherein the refrigerant (315, 316, 318, 328, 329) in the recirculating refrigeration process is a multicomponent mixture comprising nitrogen, i-pentane, and n-pentane with the molar ratio of i-pentane to n-pentane in the refrigerant (315, 316, 318, 328, 329) being greater than one, and wherein the i-pentane and n-pentane are obtained from the feed gas stream (1) and the molar ratio of i-pentane to n-pentane in the refrigerant (315, 316, 318, 328, 329) is greater than the molar ratio of i-pentane to n-pentane in the feed gas stream (1).

4. A method of claim 1 or claim 2, wherein the refrigerant (315, 316, 318, 328, 329) in the recirculating refrigeration process is a multicomponent mixture comprising nitrogen, i-pentane, and one or more hydrocarbons having four carbon atoms, the i-pentane and the one or more hydrocarbons having four carbon atoms being obtained from the feed gas stream (1), and the molar ratio of i-pentane to n-pentane in the refrigerant (315, 316, 318, 328, 329) being greater than one, wherein the i-pentane and n-pentane are obtained from the feed gas stream (1) and the molar ratio of i-pentane to the one or more hydrocarbons having four carbon atoms in the refrigerant (315, 316, 318, 328, 329) is greater than the molar ratio of i-pentane to the one or more hydrocarbons having four carbon atoms in the feed gas stream (1).

5. A method of claim 1 or claim 2 wherein the refrigerant (315, 316, 318, 328, 329) in the recirculating refrigeration process comprises (in mole %) 5-15% nitrogen, 30-60% methane, 10-30% ethane, 0-10% propane, and 5-15% i-pentane.

6. A method of claim 1, wherein the further cooling of the cooled refrigerant stream (329) is effected by indirect heat exchange with the coldest refrigerant (315) vaporizing in the coldest heat exchange zone (312).

7. A method of claim 1, wherein, prior to vaporization to cool the compressed refrigerant stream (328, 339), a cooled reduced-pressure liquid refrigerant (345) is reduced in pressure and is combined with the partially vaporized refrigerant (316) to provide a combined two-phase refrigerant (347) that is vaporized to cool the compressed refrigerant stream (328; 339), the compressed refrigerant vapor (330) is cooled (332) to provide a partially-condensed refrigerant, the partially condensed refrigerant is separated (333) into a refrigerant vapor stream (334) and a refrigerant liquid stream (335), the refrigerated vapor stream (334) is compressed (336) and cooled (337) to form a partially condensed stream and the partially-condensed stream is separated (338) into the compressed refrigerant vapor (328, 339) and a liquid stream (340), the pressure of the liquid refrigerant is reduced (341) to provide a reduced-pressure liquid refrigerant (342), the reduced-pressure liquid refrigerant (342) is combined with the refrigerant liquid stream (343) and subcooled by indirect heat exchange (344) with the combined two-phase refrigerant (347) to provide the cooled reduced-pressure liquid refrigerant (345) for combining with the partially vaporized refrigerant (316).

8. A system for liquefying a gas stream (1) by a method of claim 1, which system comprises:
at least two heat exchange zones (310, 311 312; 353) adapted for cooling the gas stream (1) successively through respective temperature ranges to provide a liquefied product (13) and
respective refrigeration systems for providing respective refrigerants in respective refrigerant lines (117, 213, 315) to the heat exchange zones (310, 311, 312; 353),
wherein the coldest heat exchange zone (312) is adapted to only partially vaporize the respective (i.e., coldest) refrigerant (315),
wherein the refrigeration system providing the coldest refrigerant is a recirculating refrigeration system comprising:
a further heat exchange zone (317, 355) adapted to further vaporize the resultant partially vaporized refrigerant at temperatures above the highest temperature of the coldest heat exchange zone (312),
compression means (319, 324; 349) for compressing the vaporized refrigerant to provide the compressed refrigerant stream,
piping means (318, 348) to provide vaporized refrigerant from the further heat exchange zone (317, 355) to the compression means (319, 324; 349),
means to provide compressed refrigerant (328, 354) to the further heat exchange zone (317, 355),
piping means to convey a cooled compressed refrigerant from the further heat exchange zone (317; 355) to the coldest heat exchange zone (312), and
means to further cool (356) the cooled compressed refrigerant to provide a cooled compressed refrigerant (313),
characterized in that the means to provide compressed refrigerant (328; 354) to the further heat exchange zone (317, 355) comprises either
(i) piping means (329) to convey the entire compressed refrigerant stream (328) to the further heat exchange zone (317), wherein the further heat exchange zone (317) is adapted to provide self-refrigeration for the recirculating refrigeration system, or
(ii) piping means to convey the entire compressed refrigerant stream (351) to a heat exchange zone (353) that precedes the coldest heat exchange zone (312), wherein the heat exchange zone (353) is adapted to cool the entire compressed refrigerant stream (351) by indirect heat exchange (352), and piping means to convey an intermediate cooled compressed refrigerant (354) to the further heat exchange zone (355).

9. A system of claim 8, wherein
the means to further cool (356) the cooled compressed refrigerant to provide a condensed refrigerant comprises the coldest heat exchange zone (312) and
the system further comprises pressure reduction means (314) to reduce the pressure of the condensed refrigerant to provide the refrigerant to the refrigerant line (315) for the coldest heat exchange zone (312).

10. A system of claim 9, wherein the further heat exchange zone (344) includes means for subcooling a refrigerant liquid to provide a subcooled refrigerant liquid and the coldest refrigeration system comprises pressure reduction means (346) for reducing the pressure of the subcooled refrigerant liquid to provide a reduced-pressure refrigerant, piping means (347) for combining the reduced-pressure refrigerant with the partially vaporized refrigerant from the coldest heat exchange zone (312) to provide a combined vaporizing refrigerant stream to the further heat exchange zone (344), and piping means (330) to feed a combined vaporized refrigerant stream to the compression means.

11. A system of claim 10, wherein the compression means for compressing the vaporized refrigerant (330) from the further heat exchange zone (344) comprises:
a first stage compressor (331),
an intercooler (332) adapted to cool and partially condense the resultant first compressed refrigerant stream from first stage compressor (331) to yield a partially-condensed first refrigerant stream, a first separator (333) to separate the partially condensed first compressed refrigerant stream into a first vapor refrigerant stream and a first liquid refrigerant stream, a second stage compressor (336) to compress the first vapor refrigerant stream to provide a compressed vapor refrigerant stream, an aftercooler (337) to cool the compressed vapor refrigerant stream to provide a cooled two-phase refrigerant stream, a second separator (338) to provide a second liquid refrigerant stream (340) and the and the compressed refrigerant to piping means (339) for feed to the further heat exchange zone (344), pressure reduction means (341) to reduce the pressure of the second liquid refrigerant stream to provide a reduced-pressure second refrigerant stream, and piping means (335, 342, 343) to combine the reduced-pressure second refrigerant stream and the first liquid refrigerant stream to provide the refrigerant liquid to the further heat exchange zone (344).

12. A system of claim 8 for liquefying a gas stream (1) by a method of claim 1, wherein the coldest refrigeration system comprises:

piping means (348) to provide the vaporized refrigerant from the further heat exchange zone (355) to the compression means (349) for compressing a vaporized third refrigerant (348) to provide a compressed refrigerant, cooling means (352) in a heat exchange zone preceding the coldest heat exchange zone (312) for cooling the compressed refrigerant (351) by indirect heat exchange with the respective refrigerant (117) vaporizing in the heat exchange zone (353) to provide a cooled compressed refrigerant, piping means (354) to provide the cooled compressed refrigerant to the further heat exchange zone (355) to further cool the cooled compressed refrigerant by indirect heat exchange with the vaporizing refrigerant from the coldest heat exchange zone (312) to provide a condensed refrigerant (329) and the vaporized third refrigerant (348), and pressure reduction means (314) to reduce the pressure of the condensed refrigerant to provide the refrigerant to the refrigerant line (315) to the coldest refrigerant zone (312).

\* \* \* \* \*

UNITED STATES PATENT AND TRADEMARK OFFICE
CERTIFICATE OF CORRECTION

| | |
|---|---|
| PATENT NO. | : 7,308,805 B2 |
| APPLICATION NO. | : 11/375425 |
| DATED | : December 18, 2007 |
| INVENTOR(S) | : Mark J. Roberts |

Page 1 of 1

It is certified that error appears in the above-identified patent and that said Letters Patent is hereby corrected as shown below:

Column 17, Line 61

In claim 8 delete the word "311 312;" and insert -- 311, 312; --

Column 19, Line 11

In claim 11 delete the words "and the"

Signed and Sealed this

Eighth Day of April, 2008

JON W. DUDAS
*Director of the United States Patent and Trademark Office*